United States Patent
Beiroumi et al.

(10) Patent No.: US 8,130,713 B2
(45) Date of Patent: Mar. 6, 2012

(54) SYSTEM AND METHOD FOR CREDIT-BASED CHANNEL TRANSMISSION SCHEDULING (CBCTS)

(75) Inventors: Mohammad Zib Beiroumi, København NV (DK); Ken Jakobsen, Værløse (DK)

(73) Assignee: Motorola Solutions, Inc., Schaumburg, IL (US)

( * ) Notice: Subject to any disclaimer, the term of this patent is extended or adjusted under 35 U.S.C. 154(b) by 455 days.

(21) Appl. No.: 12/474,929

(22) Filed: May 29, 2009

(65) Prior Publication Data

US 2010/0303044 A1    Dec. 2, 2010

(51) Int. Cl.
    *H04W 4/00*    (2009.01)
(52) U.S. Cl. ........................................ 370/329
(58) Field of Classification Search .......... 370/310–350; 455/422.1–466
    See application file for complete search history.

(56) References Cited

U.S. PATENT DOCUMENTS

| 6,047,000 | A | 4/2000 | Tsang |
| 2003/0235202 | A1 | 12/2003 | Van Der Zee |
| 2006/0256723 | A1 | 11/2006 | Hellenthal |
| 2008/0002582 | A1* | 1/2008 | Li ................................ 370/235 |
| 2009/0232015 | A1* | 9/2009 | Domschitz et al. ........... 370/252 |

OTHER PUBLICATIONS

PCT International Search Report Dated September 9, 2010.

* cited by examiner

*Primary Examiner* — Hassan Kizou
*Assistant Examiner* — Charles C Jiang
(74) *Attorney, Agent, or Firm* — Barbara R. Doutre; Anthony P. Curtis; Daniel R. Bestor

(57) ABSTRACT

Credit based channel transmission scheduling (CBCTS) of packet data units (PDUs) on a downlink channel is provided based on priority, quantity, and timing efficiency. The CBCTS technique includes initializing a set of credit accounts with a set of credit values. Credit accounts are sorted to determine the account having the highest number of credits. An account is selected from the set having an associated PDU type that is ready for transmission and has a size that fits within a MAC block. The selected PDU is inserted into the MAC block. The cost associated with the inserted PDU is subtracted from the credits. The selected PDU size is subtracted from the MAC block size, and a determination is made as to whether there is free space remaining on the MAC block for insertion of additional PDUs. If so, another sort and search is performed prior to transmission on the downlink channel.

19 Claims, 3 Drawing Sheets

SYSTEM AND METHOD FOR CREDIT-BASED CHANNEL TRANSMISSION SCHEDULING (CBCTS)

TECHNICAL FIELD

The present invention relates generally to communication systems and more specifically to transmission scheduling of packet data units within communication systems.

BACKGROUND

Mobile wireless communication systems, for example cellular telephony or private mobile radio communication systems, typically provide for radio telecommunication links to be arranged between a plurality of user or subscriber terminals, often termed 'mobile stations', MSs, via a system infrastructure including one or more base transceiver stations (BTSs).

Many of these systems utilize duplex (two-way communication) paths which can be arranged in a frequency division duplex (FDD) configuration, whereby a frequency is dedicated for uplink communication, i.e. from a MS to its serving BTS, and a second frequency is dedicated for downlink communication, i.e. from a serving BTS to one or more MSs. Alternatively, the paths can be arranged in a time division duplex (TDD) configuration, whereby a first time period is dedicated for up-link communication and a second time period is dedicated for downlink communication.

An example of a mobile wireless communication system is a TETRA (TErrestrial Trunked RAdio) system, which is a system operating according to TETRA standards or protocols as defined by the European Telecommunications Standards Institute (ETSI). A primary focus for a TETRA system is use by the emergency services, as TETRA provides efficient dispatch and control services. The system infrastructure in a TETRA system is generally referred to as a switching and management infrastructure (SwMI), which contains substantially all of the communication elements apart from the MSs.

The communication system may provide radio communications between the infrastructure and MSs (or between MSs via the infrastructure) of information in any of the known forms in which such communications are possible. In particular, information may represent speech, sound, data, picture or video information. Data information is usually digital information representing written words, numbers etc, i.e. the type of user information processed in a personal computer, often referred to in relation to communication in a network as 'text' information or 'packet data' information. In addition, control signalling messages are communicated. These are messages relating to the communication system itself, e.g. to control the manner in which user information is communicated in compliance with the selected industry protocol such as TETRA. Different channels may be used for communication of the different forms of information. In particular, control channels are used for transmission of control signals, and packet data channels (PDCHs) are used to provide packet data units (PDUs) in which packet data information is sent to or from MSs.

Packet data Units (PDUs) include besides user data, information such as type, source/destination user id, size, etc and are used for processing and controlling data communication according to the specified standard. The transmission of PDUs is typically based on priority. The prioritization between PDUs makes it possible to achieve the required Quality of Service (QoS) in the system. The QoS is mainly defined by two parameters, throughput and processing delay. The requirements of the QoS depend on the application type and can also be imposed by the protocols in the standard. However, it is possible for PDUs having lower priority to end up being completely excluded by higher priority PDUs. It can also be difficult to efficiently control transmission with PDUs of varying priorities and sizes. While Class Based Weighted Fair Queuing (CBWFQ) has been utilized for wired link transmission, the wired link transmission does not face issues with capacity or efficiency that can be seen in a wireless link environment.

Accordingly, there is a need to improve the scheduling of PDUs so that message transmission occurs in an efficient and controllable manner particularly in a wireless link environment, especially with the latest tendency to move from circuit-switched approaches for the voice traffic to a fully packet-switched model as is the case for 3GGP Long Term Evolution (LTE).

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
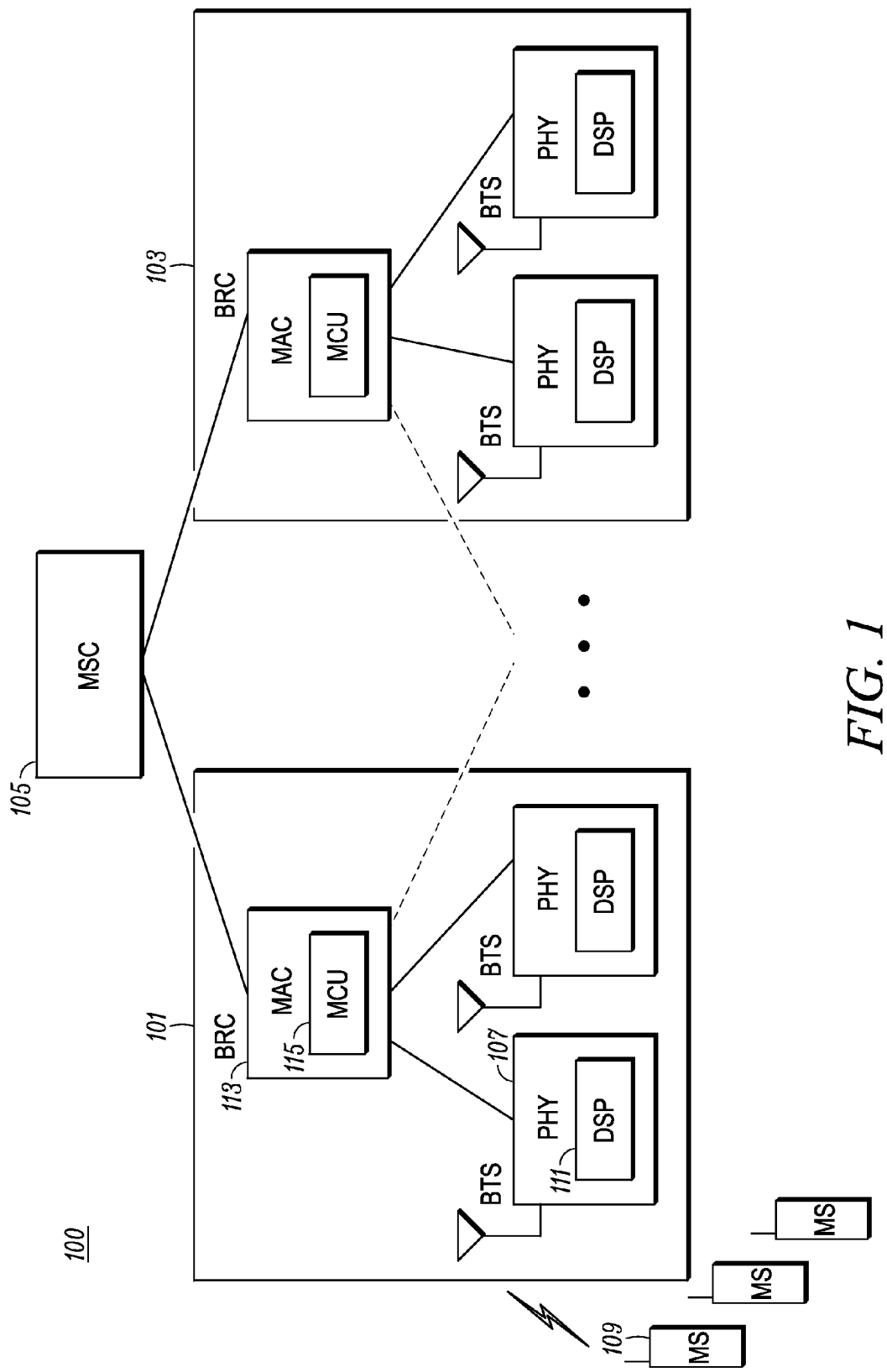
FIG. 1 is a block schematic diagram of a mobile communication system in accordance with various embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Before describing in detail embodiments that are in accordance with the present invention, it should be observed that the embodiments reside primarily in a system and technique that provides credit-based scheduling for the transmission of packet data units (PDUs) within a communication system. The credit-based channel transmission scheduling (CBCTS) technique provides for the transmission of PDUs on a downlink channel in an efficient manner wherein factors including priority, continuity and transmission efficiency are addressed.

For the purposes of this application the terms priority and Quality of Service are defined as follows below:

Priority: Priority is used to arbitrate between a number of requests from users who desire access to a system or a service. For limited network capacity, the network can grant access to users based on both user priority in the network, which is related to the service, and network priority, which is related to how the network treats a particular user's data through the network. This can include group priority.

Quality of Service (QoS): Quality of Service defines the level of treatment that a network provides to a user's transmissions, and may include parameters such as bit error rate, packet latency, service response time, packet loss, signal-to-noise ratio, echo, cross talk, etc. It may also include providing a different priority to different applications and users.

FIG. 1 shows a communication system 100 operating in accordance with an embodiment of the invention. The system 100 may be a TETRA system, Global System for Mobile Communications) GSM network, Universal Mobile Telecommunications System (UMTS) network, 3GGP Long Term Evolution (LTE) network, or other communication system that utilizes a Medium Access Control (MAC) layer within its protocol stack.

The communication system 100 includes a plurality of base stations, shown as first base station 101 and second base station 103, linked via a mobile switching centre 105. Base station 101 comprises a plurality of base transceiver stations (BTS) 107 providing radio communication to a plurality of mobile stations (Ms) 109, also known as mobile subscribers, within range of the BTS. Base station 101 further comprises a base radio controller (BRC) 113 providing control functions between the BTSs 107 and the mobile switching centre (MSC) 105 responsible for handling inter-cellular handoff, mobile location, paging and other control and management functions. Each BTS 107 includes a digital signal processor (DSP) 111 which controls a physical layer (PHY) of uplink and downlink channels with which to communicate with the MSs 109. Each BRC 113 includes a micro-controller (MCU) 115 with which to control a medium access channel (MAC) layer of the base station 101. The DSP 111 and MCU 115 each have their own respective processor and memory.

In operation if, for example, an MS 109 is to communicate with another mobile station, the MS 109 first registers with the base station 101 by a known procedure which includes sending radio messages between the MS 109 and the BTS 107 thereby passing messages to the DSP 111. The DSP 111 verifies that the MS is to be served by the base station 101. When registration has been established, a communication set up request radio signal is received from the MS 109 at the BTS 107 and is passed from the DSP 111 to the MCU 115.

In accordance with the various embodiments, MCU 115 controls a credit-based channel transmission scheduling (CBCTS) technique within the MAC layer of the base station 101 to schedule the transmission of PDUs on a downlink channel. The CBCTS technique schedules the transmission of PDUs in an efficient manner wherein three main factors are addressed: priority, continuity and transmission efficiency while operating in compliance with the protocol standard, such as TETRA or other standard, that utilizes the MAC layer.

The user of each mobile station served by the base station 101 wishing to send a packet data communication initially requests packet data services (e.g. by selection from a menu displayed on a display of the mobile station) and is thereby connected via the BTS 107 to the DSP 111 via the PHY layer. Next, the mobile stations are notified of forthcoming random access opportunities that the MCU 115 has allocated for making requests via a control channel to have access to a data channel. These requests may be defined slots in the timing structure, such as the TETRA TDMA timing structure or other protocol timing structure. Next, a resource reservation request is made to send a packet data communication. The request is sent from MS 109 to the BTS 107 via a control channel (e.g. the Main Control Channel MCCH) in one of the defined slots and, if successful, is passed by the BTS 107 to the BRC 113 and thus MCU 115. The request includes an indication of the size (length of time) of the data package to be sent. In practice, the request is sent in a resource request data message ('PDU') in which there is a field indicating how many slots are required. The MAC layer addressing software of the MS 109 automatically calculates this size.

Figure 2:
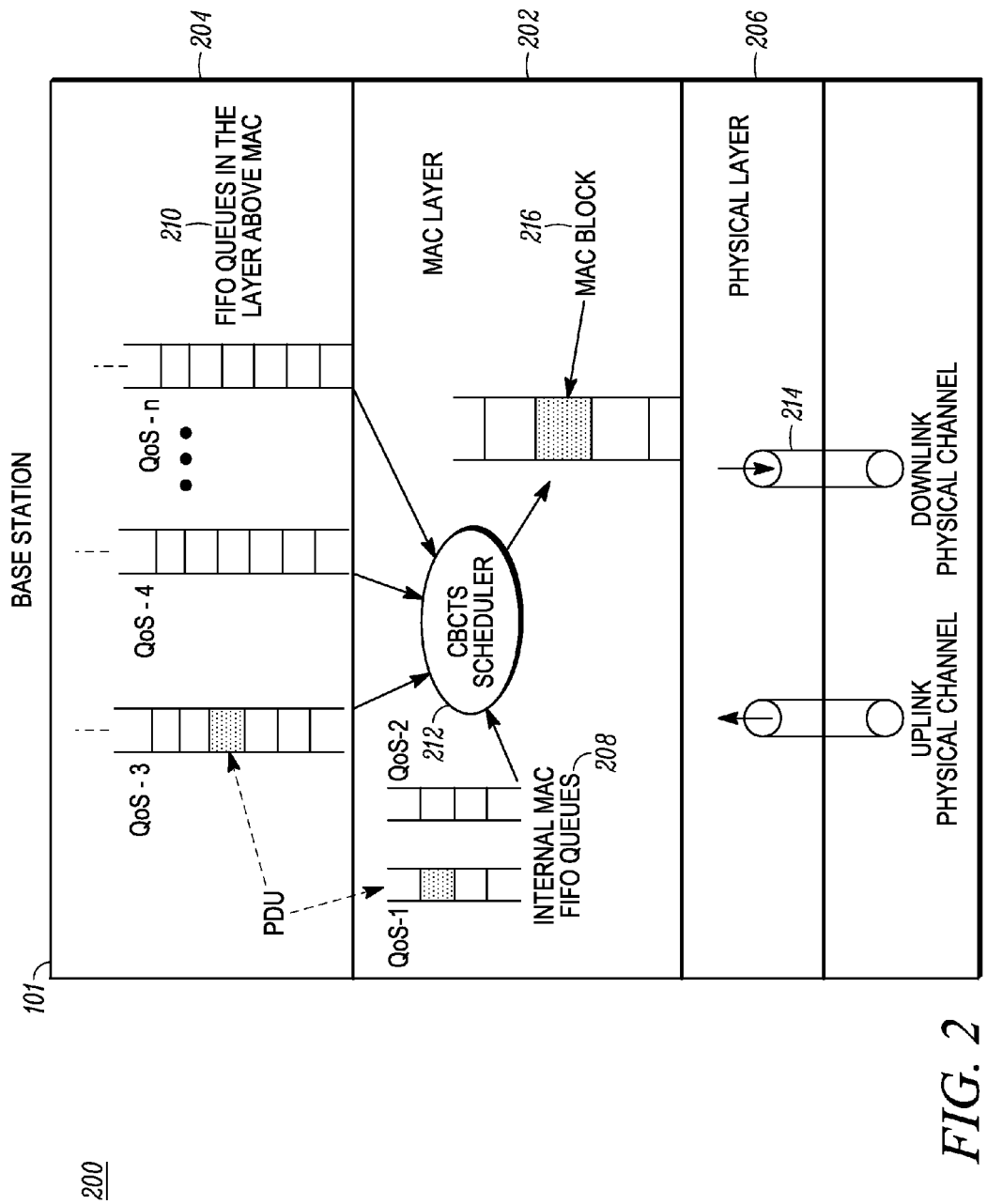
FIG. 2 is a graphical representation for the operation of a credit-based channel transmission scheduling (CBCTS) technique in a medium access control (MAC) layer at the base station of FIG. 1 in accordance with various embodiments.

FIG. 2 shows graphical representation 200 for the operation of CBCTS scheduling in a MAC layer 202 occurring at the base station 101. The PDU requests come to the MAC layer 202 both from the upper and lower layers 204, 206. Each PDU is stored in a First In First Out (FIFO) queue that matches its required quality of service (QoS), and a timestamp is added in order to discard PDUs that are being stored longer than a time constraint needed to maintain the PDU real-time QoS. As shown in this example, MAC layer 202 includes Internal MAC FIFO Queues 208 represented by QoS-1 and QoS-2 while FIFO queues 210 in the layer above the MAC layer 204 are represented by QoS-3, QoS-4, . . . QoS-N.

Determining the QoS for a PDU may depend for example on its type, source user, protocol timer, etc. Each queue will be assigned a credit account in accordance with a credit-based channel transmission scheduler 212. The CBCTS scheduler 212 operates in MAC layer 202 and is controlled by BRC MCU 115 of FIG. 1. Each queue typically stores one type of PDU, but it may contain more than one type as long as they have the same QoS requirement. PDU types may be, but are not limited to, acknowledge (ACK), reserve, broadcast, data, and voice. The number of credits added to an account corresponds to the configured share of its associated PDU queue. The BRC MCU 115 prioritizes between the PDU queues based on the number of credits the PDUs have in their respective accounts. The BRC MCU 115 further deals with the bursty nature of traffic.

The PHY layer 206 implemented of BTS 107 is responsible for transmitting MAC PDUs on downlink channels 214. In Time Division Multiple Access (TDMA) based protocols such as TETRA or GSM, the MAC scheduler 212 is executed at every time slot (equal to 14.16 ms in TETRA and 0.57 ms in GSM) and it needs to select one or more PDUs to fill a MAC block 216 which is transmitted on the downlink channel 214. The MAC block 216 has typically a fixed size but some standards specify a set of values to choose between, and the MAC protocol permits the concatenation of multiple PDUs into a single MAC block as long as they can fit within the block size. A similar mechanism is also specified for the MAC layer in UMTS and referred to a multiplexing of logical channels. The BRC MCU 115 performs the CBCTS scheduling such that the user can easily configure the scheduling of each PDU type in the MAC layer 202 to meet every type's requirements regarding throughput and timing constraints, while maintaining overall bandwidth efficiency. The CBCTS technique guarantees that every message type will get a minimum share of the total number of messages transmitted on the downlink channel 214 over a given interval of time.

In accordance with the embodiments, the BRC MCU 115 controls the CBCTS scheduling and shapes the packet data traffic into and out of the MAC layer 202 to obtain the best trade off between real-time, throughput and overall transmission efficiency. Firstly, the BRC MCU 115 divides the channel capacity (the physical channels in the PHY layer) between all PDU types according to predetermined configured ratios. As such, every PDU type gets at least its configured percentage of channel capacity even during congestion. Secondly, the CBCTS scheduling tries to find best trade off between the different throughput and real-time requirements of PDUs. As is known, the bursty nature of traffic makes it difficult for the scheduler to meet both the throughput and real-time requirements. For example, during peak traffic periods the scheduler should allow, to some extent, the PDUs with higher real-requirements to be processed first and let others to be processed when the peak is over. This desired property can be realized by using different upper/lower account limits (UL and LL) in the CBCTS technique to be described herein. Thirdly, the BRC MCU 115 efficiently deals with concatenation (also known as multiplexing) that exists in almost every MAC layer of communication systems, such as TETRA, GPRS, UMTS and 3GGP LTE.

Accordingly, the credit accounts belonging to the queues with high real-time requirements should be assigned relatively higher upper and lower limit values than queues with less real-time requirements. By making this configuration the BRC MCU 115 CBCTS technique will select time sensitive PDUs during congestion time and leave non-sensitive PDUs to underloaded periods.

Figure 3:
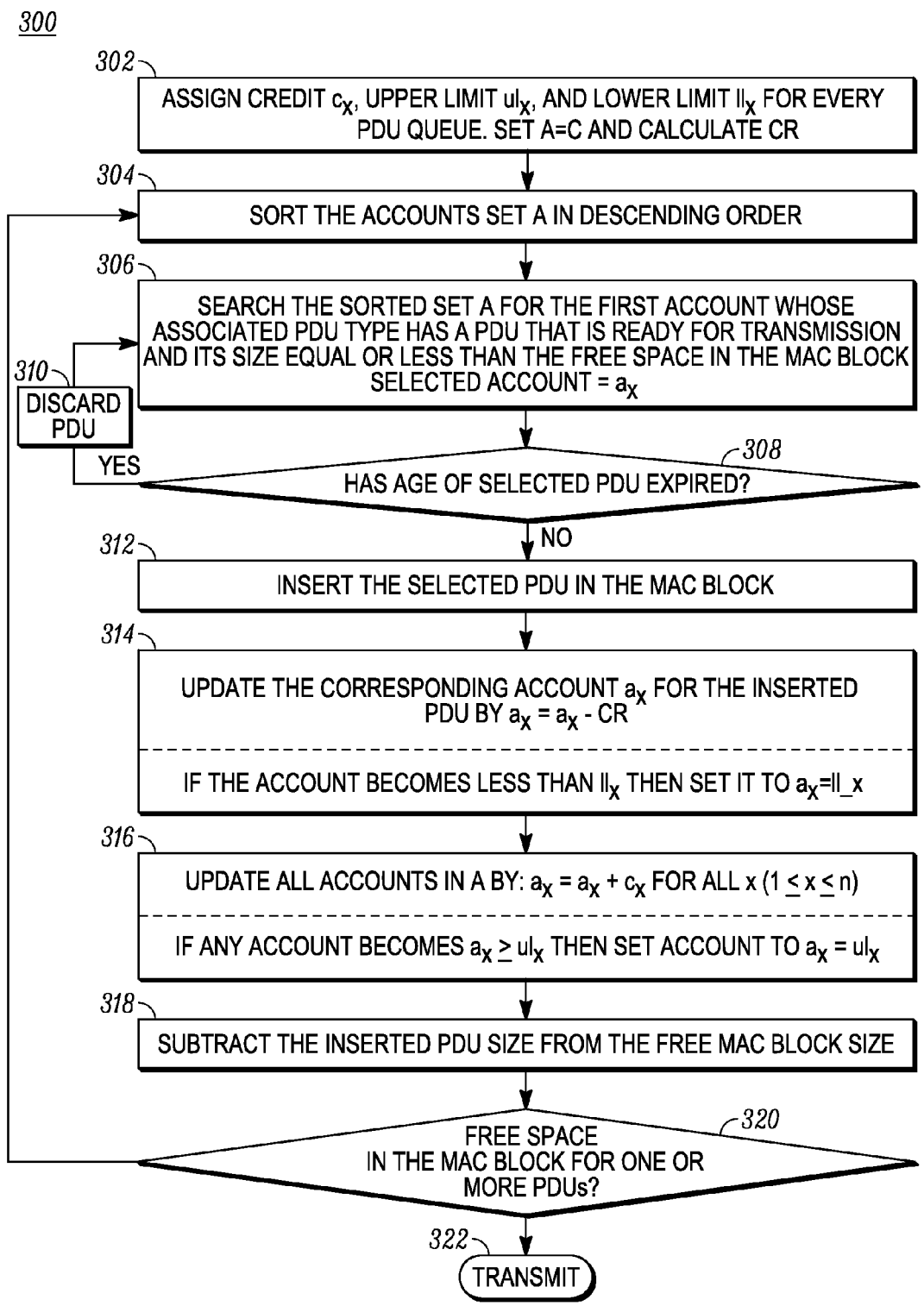
FIG. 3 is a flowchart of the CBCTS technique operated by a micro-controller within the base station of FIG. 1 in accordance with various embodiments.

A detailed procedure employed by the BRC MCU 115 follows next. Referring now to FIG. 3, the CBCTS technique 300 runs periodically, for example for each timeslot in a TETRA TDMA timing structure for which the BRC MCU 115 is about to select PDUs for downlink transmission. The technique 300 begins by an initialization step 302 in which a set of credit accounts (A), one account for every PDU queue, is assigned a predetermined set of credit values $c_x$, upper and lower account limits ($ul_x$, $ll_x$) are also assigned for every account, finally the cost of credits to transmit a single PDU (CR) is calculated. Step 302 is executed only once in the first run. Moving to step 304, the accounts in set A are sorted in descending order. As such, the first element in the sorted account will have the highest number of credits.

Searching of the sorted set A is executed at step 306. The search seeks the first account whose queue has a PDU that is ready for transmission and its size equal to or less than the free space in the MAC block. Let the selected account denoted as $a_x$ and its upper/lower limits are $ul_x/ll_x$. The age (residence time in the queue) of the selected PDU can be checked at step 308 but in this case a timestamp should be given to every PDU once enters the queue. If the PDU age has exceeded the time requirement then the PDU is discarded at 310 and a new search is performed back at 306 to seek another PDU that is valid for transmission. The information about the discarded PDUs can be used as input for a possible Admission Control Scheme in the MSC to further improve user access to the system. If the age is still within time requirement at 308, then the valid PDU is inserted into the MAC block at 310.

Next at 312, an update is made to the corresponding account $a_x$ for the inserted PDU by subtracting CR, the cost of credits to transmit a single PDU. Thus $a_x = a_x - CR$. If the account $a_x$ becomes less than the lower limit $ll_x$, then set $a_x = ll_x$.

Moving to 314, an update is made to all accounts in the set of credit accounts (A). Thus, $a_x = a_x + c_x$, for all x ($1 \leq x \leq n$), where n is the total number of PDU queues. If any account becomes greater than the upper limit ($a_x > ul_x$), then set that account to the upper limit $a_x = ul_x$. An account x reaches the upper limit $ul_x$ if either its associated queue is empty or the stored PDUs can not be transmitted for one or another reason (e.g the destination MS is out of coverage).

Moving to 316, the inserted PDU size is subtracted from the MAC block size. At 318, if there is still free space on the MAC block for one more PDU from any queue return to 304 to repeat the sort. Otherwise, transmission on the downlink channel occurs at 320.

To summarize:

$Q=\{q_1, q_2, \ldots, q_n\}$: a set of all PDU queues where n is the total number of queues.

$A=\{a_1, a_2, \ldots, a_n\}$: a set of credit accounts, one account for every PDU queue.

$C=\{c_1, c_2, \ldots, c_n\}$: a set of credit values given by a user to set the share of each PDU queue. The share of a PDU queue is the ratio of its credit over the sum of credits in set C.

$CR=\Sigma C$: the cost in credits to transmit a single PDU which is equal to the sum of credit values in set C.

$UL=\{ul_1, ul_2, \ldots, ul_n\}$: is a set of upper limits, one for every account, where: $ul_x = k_x * CR$, where $1 \leq x \leq n$ and ($k_x \geq 1$). Parameter $k_x$ is set by the system designer for every account to cope with the real-time requirements and traffic bursty nature as previously described.

$LL=\{ll_1, ll_2, \ldots, ll_n\}$: is a set of lower limits, one for every account, where: $ll_x = -j_x * CR$: where ($j_x \geq 1$), a lower limit that every account can not become less than, $j_x$ is a counterpart of $k_x$.

As an example, if the MAC layer has five types of PDUs to transmit ACK, RESERVE, BROADCAST, DATA, VOICE and it is determined after considering the throughput and real-time requirements that the capacity shares should be 5%, 5%, 10%, 20% and 60%, upper limit parameter $k_x$ values {8, 5, 3, 1, 10} and lower limit parameter $j_x$ values {2, 3, 5, 15, 1} respectively. Then:

Q {$q_1, q_2, q_3, q_4, q_5$}
C {5, 5, 10, 20, 60}
CR=5+5+10+20+60=100
UL={800, 500, 300, 100, 1000}
LL={−200, −300, −500, −15000, −100}

Note that the VOICE PDUs queue has the highest upper and lowest account limits because they have the highest real-time requirements in the system. It is also worthy to note that the selected transmission ratio will take place when all queues have always PDUs to transmit. If for example at some periods, VOICE is utilizing only 20% of the capacity, then the actual transmission ratio will become 10%, 10%, 20%, 40%, 20% assuming that all queues (other than VOICE) have always PDUs ready for transmission during these periods.

Thus, the procedure illustrated in FIG. 3 is run repeatedly by the MCU 115 at time intervals which suit the operational parameters of the system 100. The CBCTS scheduling technique can be used in the MAC layer of such systems as TETRA, GSM and UMTS. The CBCTS technique may also be used in general where the capacity is a limited resource and there is a need to control and shape data traffic efficiently.

The CBCTS technique 300 and system 100 operating in according with the embodiments allows a system operator to easily configure the scheduling of each PDU type in the MAC layer to meet every PDU type requirement regarding throughput and timing constraints, and at the same time maintain high overall capacity and efficiency. The technique guarantees that every message type will get a minimum share of the total number of messages transmitted on the downlink channel over a given interval of time.

Unlike the Class Based Weighted Fair Queuing (CBWFQ) technique which is designed for a wired link and thus faces no efficiency or capacity issues, the CBCTS technique operating in accordance with these embodiments is optimized for the wireless link where a few number of PDUs are selected to be transmitted in the burst. The CBCTS technique also provides the advantage of being able to address certain aspects of the MAC protocol, such as PDU concatenation (channel multiplexing).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. In addition, although various embodiments are described in detail, elements of such embodiments may be combined to form alternate embodiments.

The Abstract of the Disclosure is provided to allow a reader to quickly ascertain the nature of the technical disclosure. It is submitted with the understanding that it will not be used to interpret or limit the scope or meaning of the claims.

What is claimed is:

1. A method scheduling wireless packet data unit (PDU) transmissions on a downlink channel of a communication system, comprising:
   initializing a set of credit accounts, one credit account for every packet data unit (PDU) queue, to a predetermined set of credit values that meet throughput requirements;
   calculating a cost of credit values needed to transmit a single PDU, wherein the cost is the sum of the predetermined set of credit values;
   setting an upper account limit and a lower account limit for each of the credit accounts to meet predetermined time requirements;
   sorting the credit accounts in descending order, such that a first element in the sorted account set has the highest number of credit values;
   searching the sorted account set to determine a first account having an associated PDU type that is ready for transmission and has a size equal to or less than free space in a medium access control (MAC) block of a MAC layer;
   inserting the selected PDU into the MAC block;
   updating a corresponding account for the inserted PDU by subtracting the cost of credit values to transmit the single PDU;
   updating all accounts in the set of credit accounts by a corresponding predetermined credit value from the predetermined set of credit values;
   subtracting the PDU size from the MAC block size;
   determining whether there is free space remaining on the MAC block for insertion of another PDU and if so, returning to the step of sorting; and
   otherwise, transmitting the MAC block on the downlink channel.

2. The method of claim 1, wherein the step of searching further comprises:
   checking residence time of the PDU in the queue;
   determining whether the residence time is within a predetermined time limit requirement; and
   if the residence time is not within the predetermined time limit then discarding the selected corresponding account and repeating the search to seek another PDU that is valid for transmission.

3. The method of claim 1, wherein the step of updating the corresponding account for the inserted PDU by subtracting the cost of credit values to transmit the single PDU further comprises:
   setting the corresponding account to a lower predetermined limit selected by a system operator when the account becomes less than the lower account limit.

4. The method of claim 3, wherein the step of updating all accounts in the set of credit accounts by a predetermined credit value determined by a user further comprises:
   if any account becomes greater than the upper account limit, then setting that account to the upper limit.

5. The method of claim 1, wherein the predetermined credit value is determined by a system designer.

6. A communication system, comprising:
   a base station having a base transceiver station (BTS) controlled by a digital signal processor (DSP) and a base radio controller (BRC) controlled by a microcontroller, the BTS transmitting packet data units (PDUs);
   a plurality of mobile subscribers communicating over a wireless link with the BTS; and
   the microcontroller of the BRC:
      assigning a credit account for each PDU type, the number of credits added to each credit account corresponding to a configured share of the account's associated PDU queue
      prioritizing between the scheduling of PDUs based on the number of credits in the PDUs corresponding credit accounts. wherein the credit account having the highest number of credits and having the PDU size equal to or less than free space in a MAC block is selected for inserting the PDU into the MAC block;

inserting the PDU from the selected PDU account into the MAC block;
updating the corresponding account for the inserted PDU by subtracting a cost of credits to transmit the single PDU in response to inserting the PDU into the MAC block;
updating all accounts in the set of credit accounts by a corresponding predetermined number of credits;
subtracting the PDU size from the MAC block size ;and
determining whether there is free space remaining on the MAC block for insertion of another PDU, and returning to prioritizing the credit account with the highest number of credits in response to determining if there is free space on the MAC block;
wherein, the BTS transmitting the MAC block over the wireless link in response to the microcontroller determining that there is no free space on the MAC block for insertion of another PDU.

7. The communication system of claim 6, wherein each PDU is stored in a First In First Out (FIFO) queue that matches its required quality of service (QoS) and a timestamp is added in order to discard PDUs that are being stored longer than a time constraint needed to maintain the PDU real-time QoS.

8. The communication system of claim 6, wherein the microcontroller discards PDUs which are of a type that have not been processed within a predetermined time to maintain real-time quality of service (QoS).

9. The communication system of claim 6, wherein the communication system operates in accordance with TETRA standard procedures, UMTS standard procedures, GSM standard procedures, or 3GGP Long Term Evolution (LTE) procedures.

10. The communication system of claim 6, wherein the communication system utilizes a MAC layer at the BRC to perform credit assignment and prioritization of the PDUs.

11. The communication system of claim 6, wherein the BTS transmits MAC PDUs on a downlink channel to a mobile subscriber of the plurality of mobile subscribers.

12. A base station, comprising:
a microcontroller operating as a MAC scheduler within the base station configured to:
selecting one or more packet data units (PDUs) to fill a MAC block, the selection of PDUs being based on credit assignments to a set of credit accounts associated with each PDU queue by initializing the set of credit accounts to a predetermined set of credit values, wherein the credit assignment and the initialization of the credit accounts is controlled by the MAC scheduler;
calculating a cost in terms of credit values, needed to transmit a single PDU, wherein the cost is the sum of the predetermined set of credit values;
sorting the credit accounts in the descending order based on the credit values in each account and then selected a first account in the sorted set. that has an associated PDU type that is ready for transmission and has a size equal to or less than free space in a MAC block:
inserting the PDU from the selected PDU account into the MAC block;
updating the corresponding account for the inserted PDU by subtracting a cost of credits to transmit the single PDU in response to inserting the PDU into the MAC block;
updating all accounts in the set of credit accounts by a corresponding predetermined number of credits;
subtracting the PDU size from the MAC block size: and
determining whether there is free space remaining on the MAC block for insertion of another PDU, and returning to the sorting of the credit accounts in response to determining that there is free space on the MAC block, wherein the MAC scheduler enabling a BTS to transmit the MAC block over the wireless link in response to the MAC scheduler determining that there is no free space on the MAC block for insertion of another PDU.

13. The base station of claim 12, wherein the one or more PDUs are fit into the MAC block based on PDU priority, channel capacity and timing efficiency.

14. The base station of claim 13, wherein the microcontroller selects time sensitive PDUs for transmission during congestion time and leaves non-time-sensitive PDUs to underloaded periods.

15. The base station of claim 12, wherein the MAC block has a single size or a set of selectable sizes.

16. The base station of claim 13, wherein the MAC scheduler of the microcontroller divides channel capacity between different types of PDUs according to predetermined configured ratios thereby configuring every PDU type to have a percentage of channel capacity.

17. The base station of claim 14, wherein the MAC scheduler performs a trade off between PDU throughput and real-time requirements of the PDUs to determine transmission priority of the PDUs on the downlink channel (214).

18. The method of claim 1 further comprising storing the PDUs in First In First Out (FIFO) PDU queues.

19. The method of claim 18, wherein storing the PDUs in FIFO PDU queues is based on required quality of service (QoS) for each PDU.

* * * * *

UNITED STATES PATENT AND TRADEMARK OFFICE
CERTIFICATE OF CORRECTION

| | | |
|---|---|---|
| PATENT NO. | : 8,130,713 B2 | Page 1 of 1 |
| APPLICATION NO. | : 12/474929 | |
| DATED | : March 6, 2012 | |
| INVENTOR(S) | : Beiroumi et al. | |

It is certified that error appears in the above-identified patent and that said Letters Patent is hereby corrected as shown below:

In Column 8, Line 61, in Claim 6, delete "queue" and insert -- queue; --, therefor.

In Column 8, Line 64, in Claim 6, delete "accounts." and insert -- accounts, --, therefor.

In Column 8, Line 67, in Claim 6, delete "block:" and insert -- block; --, therefor.

In Column 10, Line 6, in Claim 12, delete "set." and insert -- set, --, therefor.

In Column 10, Line 8, in Claim 12, delete "block:" and insert -- block; --, therefor.

In Column 10, Line 17, in Claim 12, delete "size:" and insert -- size; --, therefor.

In Column 10, Line 43, in Claim 17, delete "channel (214)." and insert -- channel. --, therefor.

Signed and Sealed this
Eighteenth Day of December, 2012

David J. Kappos
*Director of the United States Patent and Trademark Office*